United States Patent [19]
Mallen et al.

[11] Patent Number: 5,524,587
[45] Date of Patent: Jun. 11, 1996

[54] SLIDING VANE ENGINE

[75] Inventors: Brian D. Mallen, Charlottesville, Va.; Jakob J. Keller, Redmond; Robert E. Breidenthal, Jr., Seattle, both of Wash.

[73] Assignee: Mallen Research Ltd. Partnership, Charlottesville, Va.

[21] Appl. No.: 398,443

[22] Filed: Mar. 3, 1995

[51] Int. Cl.⁶ .......................... F02B 53/00; F04C 18/00
[52] U.S. Cl. ...................... 123/243; 123/202; 123/559.2; 417/64; 418/24; 418/263
[58] Field of Search ................. 123/202, 208, 123/243, 559.2; 417/64, 212; 418/24, 27, 261, 263

[56] References Cited

U.S. PATENT DOCUMENTS

| | | |
|---|---|---|
| 1,102,742 | 7/1914 | Hauer . |
| 1,102,746 | 7/1914 | Hauer . |
| 1,269,937 | 6/1918 | Hutsell . |
| 1,492,456 | 4/1924 | Hansen-Ellehammer . |
| 1,605,912 | 11/1926 | Barker . |
| 1,735,477 | 11/1929 | Stuart . |
| 1,758,320 | 5/1930 | Hoss ............................. 123/243 |
| 1,914,091 | 6/1933 | Hamilton et al. . |
| 2,374,445 | 4/1945 | McFarland . |
| 2,435,476 | 2/1948 | Summers . |
| 2,556,313 | 6/1951 | Adams et al. ............................. 418/263 |
| 2,974,603 | 3/1961 | Fraser . |
| 2,985,110 | 5/1961 | Burt et al. . |
| 3,180,271 | 4/1965 | Hartmann . |
| 3,221,665 | 12/1965 | Hartmann . |
| 3,407,742 | 10/1968 | Mitchell et al. . |
| 3,437,079 | 4/1969 | Odawara ............................. 123/243 |
| 3,516,769 | 6/1970 | Korhonen . |
| 3,548,790 | 12/1970 | Pitts ............................. 123/243 |
| 3,809,020 | 5/1974 | Takitani ............................. 123/243 |
| 3,820,515 | 6/1974 | Knisch . |
| 3,869,231 | 3/1975 | Adams . |
| 3,964,447 | 6/1976 | Normandin . |
| 4,075,981 | 2/1978 | Durst . |
| 4,230,088 | 10/1980 | Southard . |
| 4,241,713 | 12/1980 | Crutchfield ............................. 123/202 |
| 4,355,965 | 10/1982 | Lowther . |
| 4,401,070 | 8/1983 | McCaan . |
| 4,638,776 | 1/1987 | Crittenden . |
| 5,277,158 | 1/1994 | Pangman . |

FOREIGN PATENT DOCUMENTS

| | | | |
|---|---|---|---|
| 860545 | 9/1939 | France ............................. | 123/243 |
| 1915976 | 10/1969 | Germany ............................. | 123/202 |
| 116414 | 5/1946 | Sweden ............................. | 123/243 |
| 8707675 | 12/1987 | WIPO ............................. | 123/243 |

*Primary Examiner*—Charles Freay
*Attorney, Agent, or Firm*—Lagerman & Jones

[57] ABSTRACT

A sliding vane engine, where the vanes slide with at least of one of an axial and radial component of vane motion, and where the compression ratio of the engine may be variably controlled. The engine includes a stator and a rotor in relative rotation, and a plurality of vanes in rotor slits defining one or more main chamber cells and one or more vane slit cells. The vanes contain extended pins that move in a pin channel for controlling the sliding motion of the vane. Fuel is mixed by incorporating air turbulence generators at or near the intake region. The intake and exhaust regions of the engine also incorporate a wave pumping mechanism for injecting and scavenging air from the main chamber cells and the vane slits. The compression ratio of the engine may be varied while the engine is in operation, and the engine geometry provides for an extended temporal duration at about peak compression. The engine is insulated by using segmented ceramic inserts on the stator and rotor surfaces.

18 Claims, 11 Drawing Sheets

SLIDING VANE ENGINE

BACKGROUND OF THE INVENTION

1. Field of the Invention

The present invention generally relates to internal combustion engines, and more particularly, to a sliding vane engine, wherein the vanes slide with either an axial or radial component of vane motion.

2. Description of the Related Art

The overall invention relates to the class of devices known as rotary vane internal combustion engines. These engines produce power through a sliding vane, positive displacement design whereby physically isolated volumetric compression and expansion occurs between the rotor, the sliding vanes, and the outer chamber casing. The vanes in such devices may have a radial motion, an axial motion, or a combination thereof, with respect to the rotor.

To date, vane designs have failed to detail a complete two-stroke design which can offer nearly twice the power-to-weight and power-to-size ratios without incurring significant pumping or throttling losses and which will operate in an efficient, reliable fashion.

Moreover, past vane engine designs have not suggested a means of allowing substantially higher efficiency without incurring the major costs of advanced, high-temperature structural materials, and without incurring differential thermal expansion difficulties related to the operating components.

Furthermore, past vane engine designs have not suggested a practical means of providing a variable compression ratio within a constant mass design. As used here, "constant mass" refers to a process which keeps the air and fuel volume predominantly within a given cell or chamber between two adjacent vanes throughout the cycle, without attempting to pump the mass to an entirely different chamber.

Also, applications requiring very large power output with minimal weight, such as commercial aviation engines, require a means to reduce the frictional power loss due to the reciprocation inertia of the vanes.

Finally, commercially available piston and Wankel rotary engine designs offer poor emissions performance and require catalytic converters to reduce emissions, and even with catalytic converters, pollutant output is substantially higher than desired, being on the order of several hundred to several thousand parts per million of $NO_x$, CO, and HC for most applications. In addition, a major drawback of the use of catalytic converters is that their effectiveness weakens over time, requiring inspection and replacement to maintain performance.

In light of the foregoing, there exists a need for an adiabatic two-stroke vane design which would provide significant fuel efficiency, reduced emissions, and weight savings advantages. Moreover, a need exists for a constant mass, variable compression ratio vane design which would optimize fuel efficiency at all ambient conditions, thereby reducing fuel consumption, and also for a design which will minimize frictional power losses due to vane inertia, thereby allowing the sliding vane design to be competitive in a much larger class of engines.

SUMMARY OF THE INVENTION

Accordingly, the present invention is directed to a sliding vane engine, wherein the vanes slide with an axial component, a radial component, or combination thereof, of vane motion that substantially obviates one or more of the problems due to the limitations and disadvantages of the related art. The invention provides several features which greatly enhance the thermal, fluid mechanical, and mechanical performance of the sliding vane design.

To achieve these and other advantages and in accordance with the purpose of the present invention, as embodied and broadly described, the invention provides for a sliding vane engine, wherein the vanes slide with at least of one of an axial and radial component of vane motion, comprising a means for injecting a fuel-air combination into a chamber; a means for extending the temporal duration at which the fuel-air combination is at about peak compression in the chamber; a means for combusting the fuel-air combination in the chamber; and a means for expansion of the fuel-air combination in the chamber.

In another aspect, the invention provides for a two-stroke sliding vane engine, wherein the vanes slide with at least of one of an axial and radial component of vane motion, comprising a stator; a rotor having a plurality of radial slits; the rotor and stator being in relative rotation; a plurality of vanes, each of the vanes sliding within each of the radial slits, the plurality of vanes defining one or more main chamber cells and one or more vane slit cells; a means for injecting fuel into the main chamber cells; and intake and exhaust regions for injecting and scavenging air from the main chamber cells, the intake and exhaust regions having a first wave pumping means for injecting and scavenging air from the main chamber cells.

In yet another aspect, the present invention provides for a sliding vane engine, wherein the vanes slide with at least of one of an axial and radial component of vane motion, comprising a stator; a rotor having a plurality of radial slits; the rotor and stator being in relative rotation; a plurality of vanes, each of the vanes sliding within each of the radial slits, the plurality of vanes defining one or more main chamber cells and one or more vane slit cells; a means for injecting fuel into the main chamber cells; intake and exhaust regions for injecting and scavenging air from the main chamber cells; and a means for controlling the compression ratio of the main chamber cells.

In still another more detailed aspect, the present invention further comprises vane pins movable within a pin channel for controlling the vane sliding; vane sealing tabs to seal the pin in the pin channel from the vane slit cells; rotor tab extensions on the rotor on either side of each of the vanes; an intake and scavenging means for the vane slit cells; a second wave pumping means for injecting and scavenging air from the vane slit cells; means for controlling the compression ratio of the engine using movable masses in the main chamber cells; pressure ports in the main chamber cells communicating with the movable masses; means to insulate the stator and rotor with segmented ceramic inserts; a means for generating air turbulence to mix the fuel and air in the main chamber cell; and at least one of a combustion residence chamber, continuous combustion geometry, and hot gas injection communicating with the fuel and air in the main chamber cell.

Some features of the present invention are further summarized below. In particular, the invention provides a means for the vane design to function as a wave pumping device during the scavenging process of a two-stroke design, thereby optimizing pumping efficiency and minimizing, if not eliminating, the need for an auxiliary pumping mechanism.

Furthermore, the invention provides a means to maintain vane slit chambers beneath the vanes at a proper pressure with respect to the corresponding main chamber cells between the vanes so as to minimize net mechanical friction and allow for an aggressive accelerative slope to the chamber path to optimize power density.

The invention also provides a means to maintain the vane slit cell surfaces at a proper temperature without necessitating complex cooling devices. Also, rotor extension tabs on either side of the vanes are provided to enhance the structural integrity of the vanes, thereby allowing thinner, lighter vanes, and also enhancing the automatic distributive cooling of the hottest portions of the chamber surface.

In addition, the invention provides means to vary the compression ratio while the engine is operating. With one such means, the compression ratio will automatically adjust to changing altitudes and ambient densities so as to maintain the same average pressure within the entire cycle, without the need for any electronic or complex mechanical regulators. This latter function should be of great value to the aviation industry and should result in significant improvements in fuel efficiency at altitudes due to the higher compression ratios permitted without incurring preignition.

This invention also provides a reliable means to obtain virtually adiabatic operation, thereby greatly increasing fuel efficiency. Furthermore, the invention provides a means to insulate the chamber surface with a segmented ceramic material with the geometry configured so that no contact will occur between the vane tips and the insulation, yet configured so as to maintain proper sealing efficiency despite the gaps. This insulation method is also provided for the rotor surface which likewise incurs no physical contact with the outer chamber wall. The method eliminates the danger of failure due to differential expansion which has plagued prior attempts to design a monolithic, adiabatic rotary engine.

The segmented ceramic inserts will allow materials to be chosen for the structural components of the rotor and stator which are not necessarily capable of sustaining the high temperatures at the exposed surface of the ceramic inserts, thereby minimizing cost and maximizing performance options. The inserts are freed from the bulk of structural loads, thereby allowing somewhat brittle ceramic materials to perform effectively with a reliable, tough metal support structure. Ceramics are generally much stronger in compression that tension, making this segmented configuration applicable for these materials.

It is the unique design of the vane engine which permits important surfaces to be insulated in this manner without frictional contact destroying the insulating material. This insulating process could not be applied to conventional piston engines or Wankel engines because of such frictional contact, nor could it be applied to a conventional vane engine in which vane tip seals were employed which contacted the chamber surface.

With the unique arrangement employed in this invention, a definite gap is designed between the vane tips and chamber surface, thereby allowing such a process to be employed and simultaneously eliminating the need for lubrication at the surface of the stator chamber. If an insufficient number of sealing stages were employed, this gap would cause unacceptable sealing losses. Therefore, this invention employs sufficient sealing stages to overcome this problem. Piston and Wankel engines cannot employ such multiple sealing stages between active fuel-air cells.

By providing a means to rotate a channel ring which houses the pin channel of the vanes, in the same direction as the rotor but at a reduced rpm and by shaping the channel shape properly, the power loss due to the inertial forces of the vanes acting on the pins in the channels can be significantly reduced.

The sliding vane engine of the present invention can be used in conjunction with the method disclosed in U.S. patent application Ser. No. 08/382,804, (Attorney Docket No. MAL.01) filed Feb. 2, 1995 by B. D. Mallen, the entire disclosure of which is hereby incorporated by reference. Portions of the specification of the Feb. 2, 1995 patent application are reproduced in appropriate sections below for ease of reference and discussion.

BRIEF DESCRIPTION OF THE DRAWINGS

The foregoing and other objects, aspects, and advantages will be better understood from the following detailed description of the embodiments of the invention with reference to the drawings, in which:

FIG. 6 is a perspective view of a square-tipped vane;

DETAILED DESCRIPTION OF THE INVENTION

Reference will now be made in detail to an embodiment of the invention, an example of which is illustrated in the accompanying drawings.

According to the present invention, an engine geometry is employed utilizing sliding-vanes which extend and retract synchronously with the rotation of the rotor and the shape of the chamber surface in such a way as to create regions of intake, compression, combustion, expansion, and exhaust, thereby providing the essential components of an engine cycle.

Figure 1:
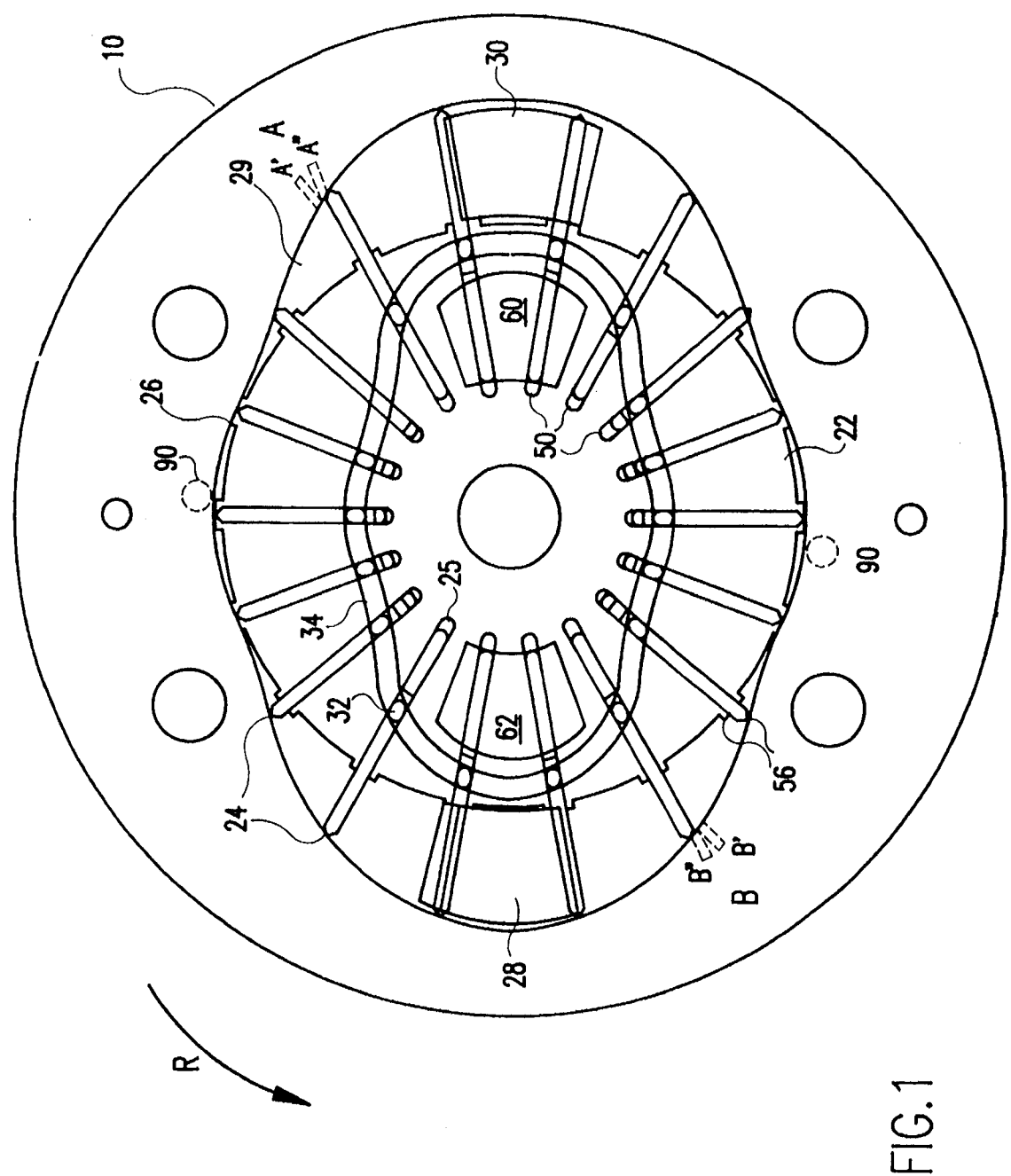
FIG. 1 is a front cutaway view of the sliding-vane engine with a radial component of motion for the vanes.

An exemplary embodiment of the vane engine apparatus of the present invention is shown in FIG. 1 and is designated generally as reference numeral 10. The apparatus contains a rotor 22, rotating in a counterclockwise direction as shown by arrow R in FIG. 1. The rotor 22 may also rotate in a clockwise direction. The rotor 22 houses a plurality of vanes 24 which slide within vane slots 25 in a radial direction in the illustrated embodiment, the vanes 24 defining a plurality of main chamber cells 29. A stator 26 forms the roughly elliptical shape of the chamber outer surface.

In general, the engine employs a two-stroke cycle to optimize the power-to-weight and power-to-size ratios of the engine. Scavenging of the exhaust with fresh air occurs at the regions of the two outer portions of the chamber shape 28 and 30, which define the intake/exhaust regions of the engine cycle. The fresh air flows through the intake region at one axial end of the engine, through the chamber in an axial direction, and towards the exhaust region at the other axial end of the engine.

Fuel is injected after the scavenging cycle is mostly or entirely completed and well before the possibility of autoignition. The fuel may be injected through a single or multiple injectors, which are aligned along the axial length of the stator, as shown by way of example and not by limitation at the points designated A and B in FIG. 1.

With the orientation shown in FIG. 1, fresh air is injected at intake/exhaust region 30, fuel is injected at point A, with exhaust exiting at intake/exhaust region 28. A second cycle occurs simultaneously with intake at region 28, fuel injection at point B, and exhaust at region 30.

Figure 2:
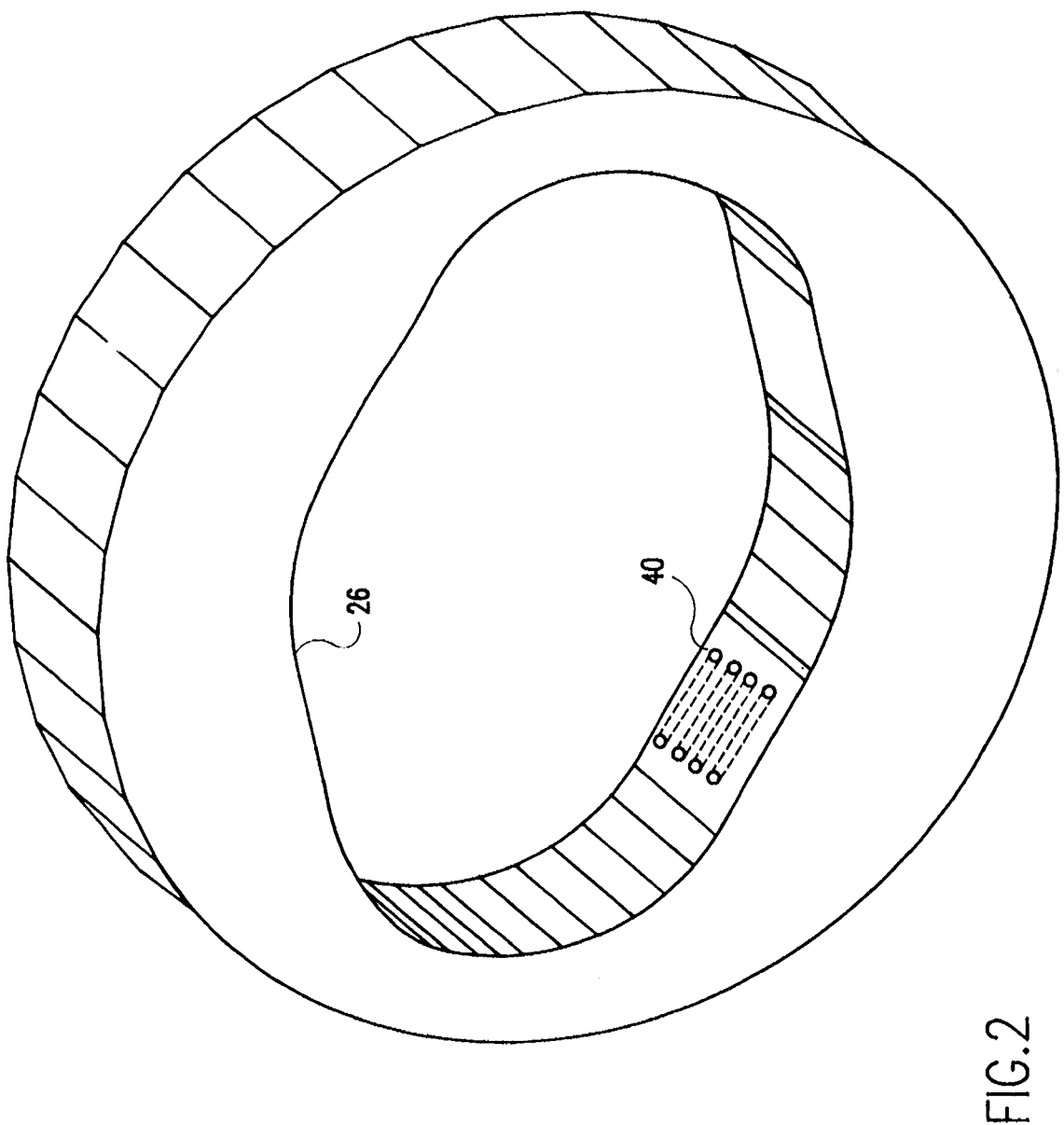
FIG. 2 is a perspective view of turbulence generating ducts within the outer chamber wall at the mid-compression region.

The turbulence generators 40, illustrated in FIG. 2, provide one example of an embodiment to achieve premixing of the air and fuel after the intake induction process, by creating strong turbulence to vigorously mix the fuel and air prior to combustion. As shown in FIG. 2, the turbulence generators 40 are comprised of ducts or channels in the outer casing at a region of compression prior to combustion. Powerful turbulence will result from the near-sonic flow speeds created by the large pressure differential between the communicating vane cells.

The ducts will produce counter-rotating vortices which modern fluid mechanical research has shown to be highly effective at achieving full mixing in minimum time. See e.g., "Mixing Jets in Confined Volumes," R. E. Breidenthal, V. R. Vuondonna, & M. F. Weisbach, *Journal of Fluid Mechanics*, Vol. 219, 1990, pp. 531–544 (hereinafter Breidenthal et al.). The ducts may be oriented at various angles other than depicted in FIG. 2. The number, angle, orientation, spread, and cross-sectional area of the ducts can all be varied to optimize performance.

Turbulence-generating devices of any type may be employed before the intake region, within the intake region, or within the engine chamber after the intake region. Regardless of their orientation or placement, however, the turbulence generators 40 function as a result of the pressure profile between the communicating vane cells and the motion of the vane. Specifically, prior to the combustion region, an upstream (in the direction of rotation R) main chamber cell 29 is at a higher pressure than the trailing main chamber cell. As the vane 24 passes the ducts, the higher pressure experienced at the duct entry propels the air in the duct back into the trailing main chamber cell via the duct exit, the resulting thrust of the jet creating turbulence, which serves to vigorously mix the trailing cell fuel-air combination.

Regarding the optimization of the mixing ducts, from earlier experiments (Breidenthal et al., pp. 531–544), the minimum mixing time in a confined volume is achieved by jet injection when the jet injection time interval is approximately four times the characteristic vortex time $t_c$ in the volume, the latter defined to be $$t_c = \left(\frac{\rho D^3}{T}\right)^{1/2}$$

where $\rho$ is the gas density in the volume, $D$ is the effective diameter of the volume, and $T$ is the average jet thrust over the length of the volume. Under the constraint that the amount of injected gas is specified, these experiments show that there is a specific optimal injection time for choked injection which yields a certain minimum mixing time.

The optimal pressure ratio across the injection nozzle is about two. This provides just-choked flow, so that the nozzle injection speed is essentially its maximum practical value. Thus the nozzle thrust, which is approximately the product of the nozzle mass flow rate and the injection speed, is a maximum per unit mass flow. It is the nozzle thrust integrated over the injection pulse, the impulse, which is responsible for the mixing.

In order to achieve the maximum engine efficiency at the minimum emission levels, the amount of injected gas must be optimized. Too much injected gas results in a loss of efficiency since work had been expended in its original compression. Too little injected gas leads to insufficient mixing and consequently excessive emissions. The requisite amount of gas injection can be determined by routine experimentation (see e.g. the Breidenthal et al. article).

The optimum geometry for the injection may consist of one or more nozzles, aligned in the axial direction and oriented in essentially the radial direction, for example A' and B' in FIG. 1, or tilted with an azimuthal component, A" and B", in the direction of cell motion. The latter orientation may permit some partial recovery of the energy of the injected gas and also serve to cool the trailing sides of the vanes and thereby the vane slits as well.

To achieve a longer effective pulse time, multiple nozzles may also be aligned in the azimuthal direction, separated by a distance corresponding to the desired pulse time. The injection nozzles are supplied with compressed gas through a pipe, tube, or channel submerged within the outer casing and connecting the nozzles from a pressure tap located at a downstream point where the pressure has risen to about twice the cell pressure at the point of injection.

The aspect ratio of the stirring vortices is optimally of order unity. This may be achieved by an axial spacing of the injection nozzles equal to approximately twice the mean radial height of the cell during the mixing interval. At each axial end of the engine, the end nozzle should be half the cross-sectional area of the interior nozzles, and located as close as practical to the internal end plane of the engine. In this way end vortices will have the same jet impulse and hence stirring as the interior vortices. The total nozzle exit area per cell is selected to provide the necessary amount of stirring in the time or corresponding azimuthal distance available before the mixture is ignited. This is specified in Breidenthal et al. as a function of the amount of injected fluid. In order to minimize piping losses, the cross-sectional area of the pipe or tube supplying the nozzle or nozzles should be large compared to the total nozzle exit are, preferably by a factor of at least three.

After the fuel-air combination is vigorously premixed, the mixture is compressed to about the peak compression level, and that level of compression is maintained for an extended temporal duration or residence time. This level of compression could be at or near the peak compression level and, for ease of discussion, is referred to generally as "peak compression".

The compression ratio is chosen so as to avoid autoignition substantially prior to the peak compression region at operating conditions. Autoignition, as used here, refers to the rapid combustion reaction which occurs spontaneously as a result of the local temperature, pressure, residence time, and fuel type. The simplest means to achieve this autoignition is to compress the fuel/air mixture until it self-ignites and basically explodes. Other means may also produce autoignition, such as the injection of hot combusted gas.

Sufficient extension of temporal duration for the peak compression region is provided so that there is adequate time to permit the autoignition to fully occur within the peak compression region for a practical range of operating speeds and conditions, with sufficient residence time remaining at this high compression region after complete combustion for the CO and HC pollutants to almost fully oxidize.

This oxidation will occur at a temperature range dependent on the composition of the fuel-air mixture. That is to say, the equilibrium values of CO and HC pollutants are extremely low at combustion temperatures and pressures associated with ultra-lean mixtures; if enough residence time is available at these temperatures and pressures, the mixture will achieve these equilibrium levels. Conventional spark-ignition engines have near-adiabatic combustion temperatures, which is approximately 2850° K. Such high combustion temperatures yield extremely high equilibrium levels of CO which do not have sufficient time during the expansion process to oxidize into $CO_2$, resulting in extremely high CO emissions.

The oxidation of CO into $CO_2$ in this invention will occur prior to the rapid expansion process which invariably changes the oxidation from a desirable equilibrium process to a rate controlled, kinetic process—an effect which occurs with virtually all positive displacement designs. This effect prevents the CO from reaching equilibrium at lower temperature and pressure regions within the expansion process and thus explains why conventional spark-ignition engines have such high CO emissions. Thus, this invention will allow the combusted mixture to achieve extremely low CO levels because of the combination of ultra-lean mixtures and extended peak compression duration.

The requisite extended temporal duration at the high compression region is achieved by a physical extension of an appropriate high compression region of the chamber shape with the possible, but not necessary, replacement or supplementation by one or more of a combustion residence chamber, a continuous combustion geometry, and hot combusted gas injection.

The combustion residence chamber 90 (see e.g. FIG. 1) is a cavity which communicates with the fuel/air charge at peak compression and may be employed to provide high-altitude operation in aviation engines or to reduce the physical duration of the high compression region to improve power density. This cavity may be of variable volume and shape.

Figure 5:
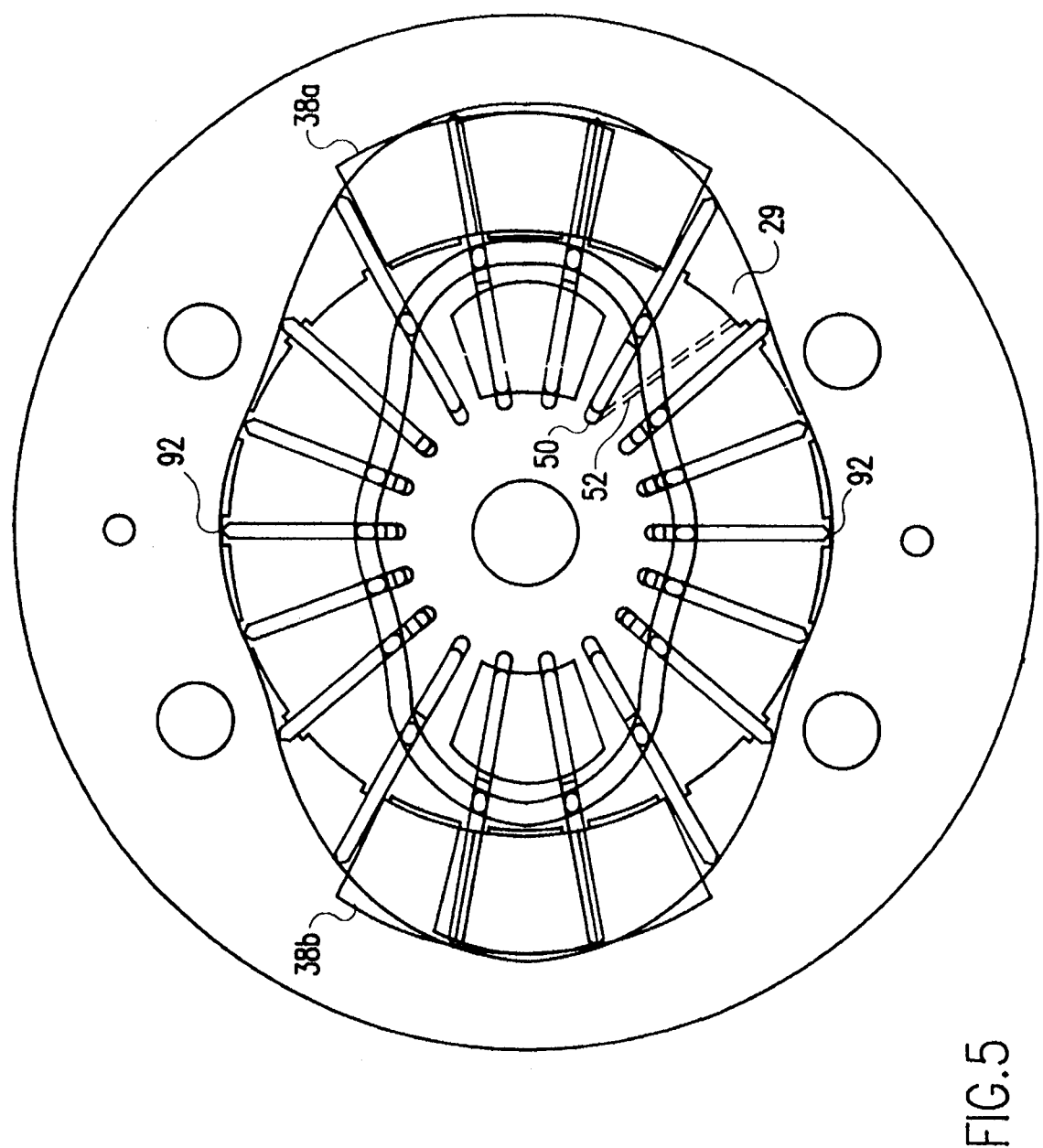
FIG. 5 is a front cutaway view of the sliding-vane engine with an externally controlled, variable compression ratio.
Figure 7:
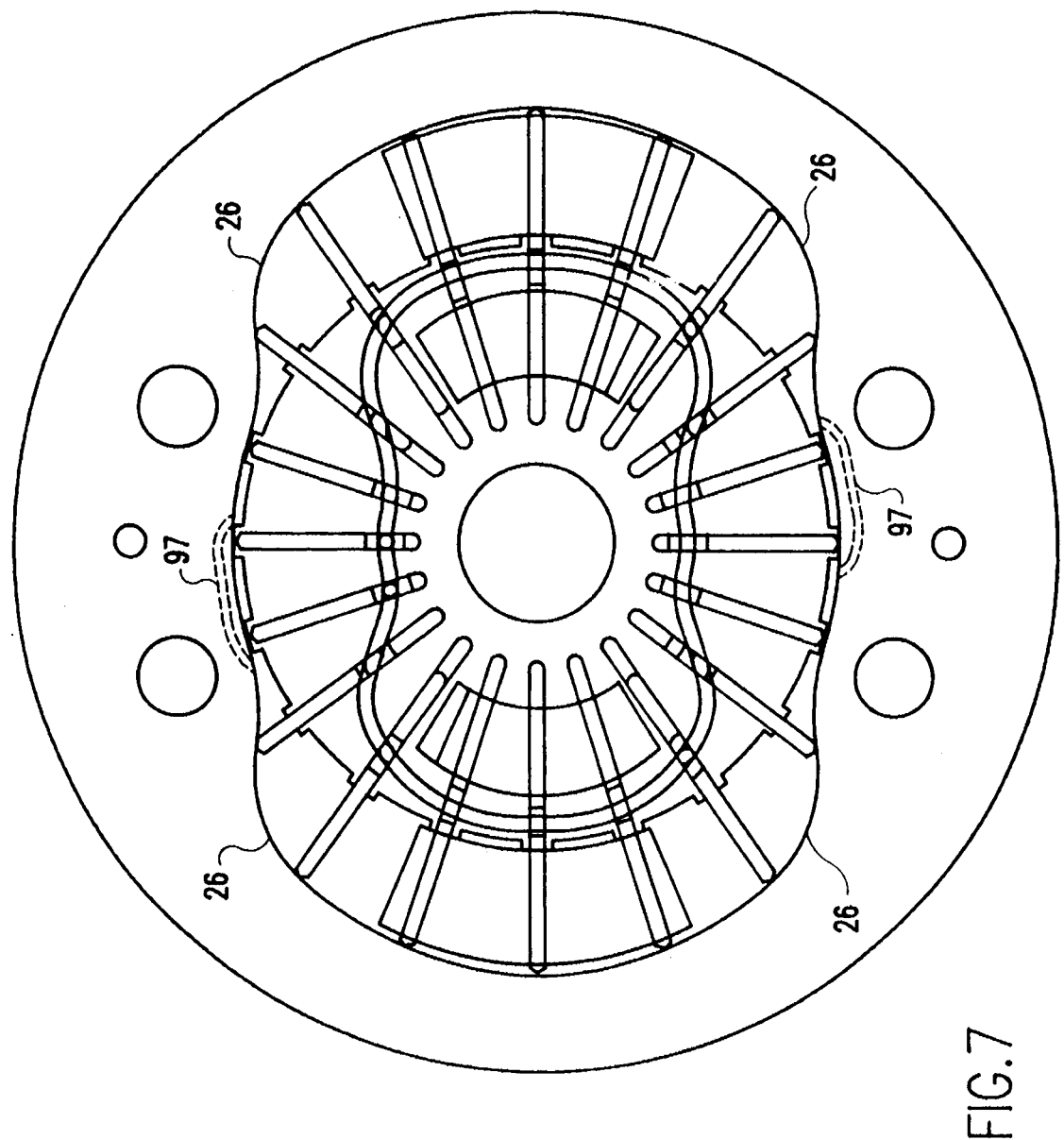
FIG. 7 is a front cutaway view of the sliding-vane engine with a radial component of motion for the vanes, and with a more aggressive chamber acceleration profile with increased scavenging duration.

The continuous combustion geometry 92 as shown in FIG. 5 produces a gap between the vane and chamber wall in a region after combustion has occurred, thereby opening the trailing vane volume to the combustion temperatures and pressures, facilitating rapid autoignition. The vanes need not change position, though they may, but there may be an actual retraction of the chamber wall shape to produce this gap. Ducting of hot, combusted gas may also achieve the same effect. These ducts 97 are shown in FIG. 7.

The physical duration of the high compression duration without a combustion residence chamber, continuous combustion geometry, or hot gas injection, will be such that the residence time at peak autoignition compression at operational speeds will be on the order of about several milliseconds at standard temperature and pressure of intake air at sea level, in order to achieve both reliable autoignition and near-complete oxidation of CO and HC without significantly raising $NO_x$ levels. Each of the combustion residence chamber, continuous combustion geometry, and hot gas injection, reduces this physical duration requirement because of the increased temporal residence duration thereby provided. Note that conventional piston engines have zero duration at peak compression, because the piston's motion is determined by the rotation of the crankshaft, and the piston begins its downward motion as soon as it reaches top dead center. Because of this geometry, conventional piston engines cannot reliably control an autoignition process within a wide range of operating speeds, temperatures, altitudes, etc., nor can they allow the CO and HC to almost fully oxidize during expansion. As a result of the geometrical limitations, the conventional piston engine cannot simultaneously achieve ultra-low $NO_x$, CO, and HC emissions.

Figure 3:
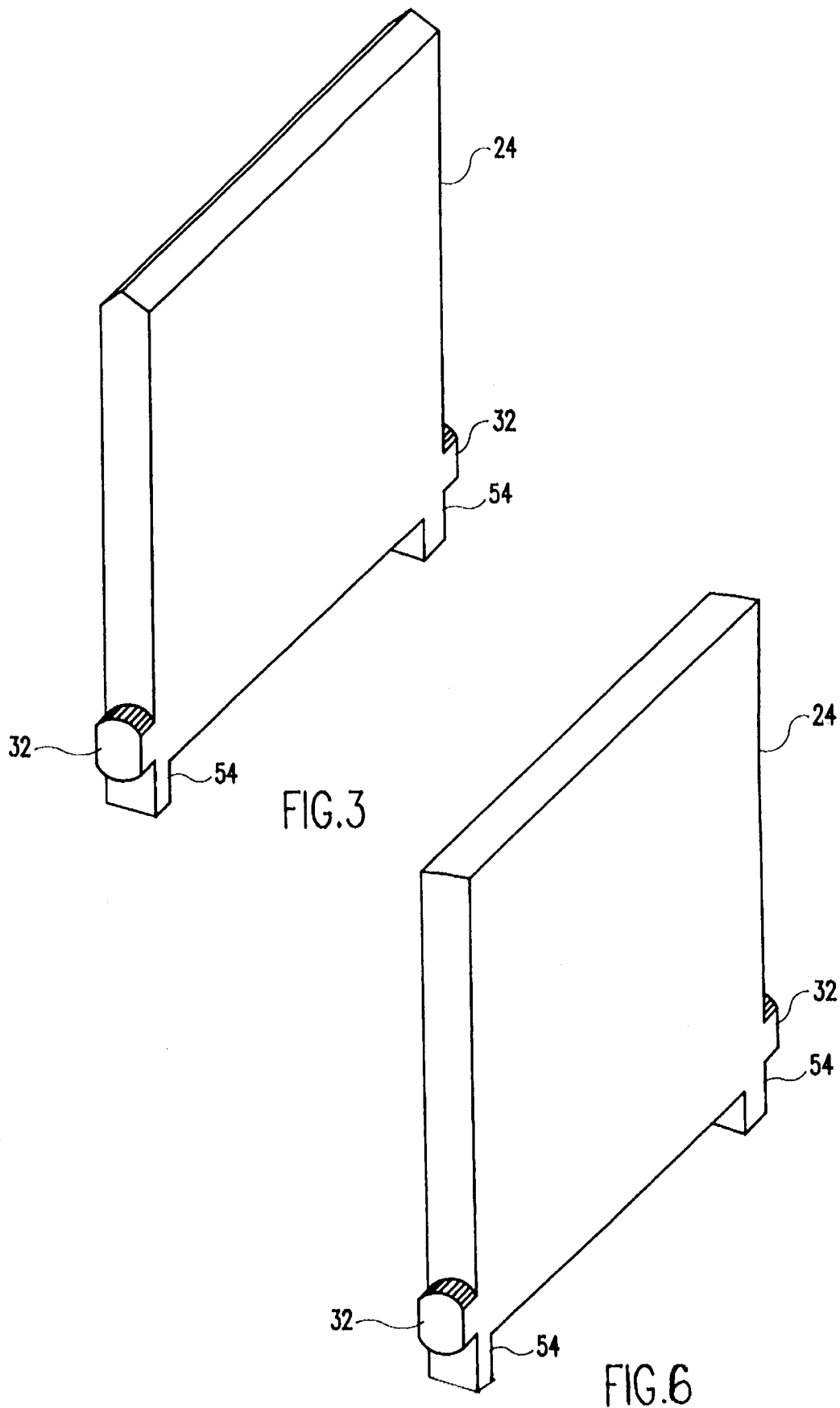
FIG. 3 is a perspective view of a vane showing the extended sealing feet.

Now, with reference to FIGS. 1, 3, and 4, the motion and operation of the vanes will now be described. The sliding motion of the vanes 24 is controlled by pins 32 which protrude from both axial ends of the vanes at the region closest to the inner diameter of the rotor in order to minimize the torque radius and thus the power loss (see FIG. 3). These pins 32 ride within pin channels 34 (see FIG. 1) in the fixed end-seal plates on either side of the rotor. The pin channels 34 are not exposed to the engine chamber and can thus be easily lubricated with a dry film, oil, or fuel, or combination thereof, without encountering major lubricant temperature problems. One or more pins may be employed on either or both axial sides of each vane.

The tips of the vanes do not significantly contact the chamber surface of the stator 26. Thus, lubrication need not be supplied to the stator surface, thereby permitting higher wall temperatures and significantly improved thermal efficiency.

Figure 4:
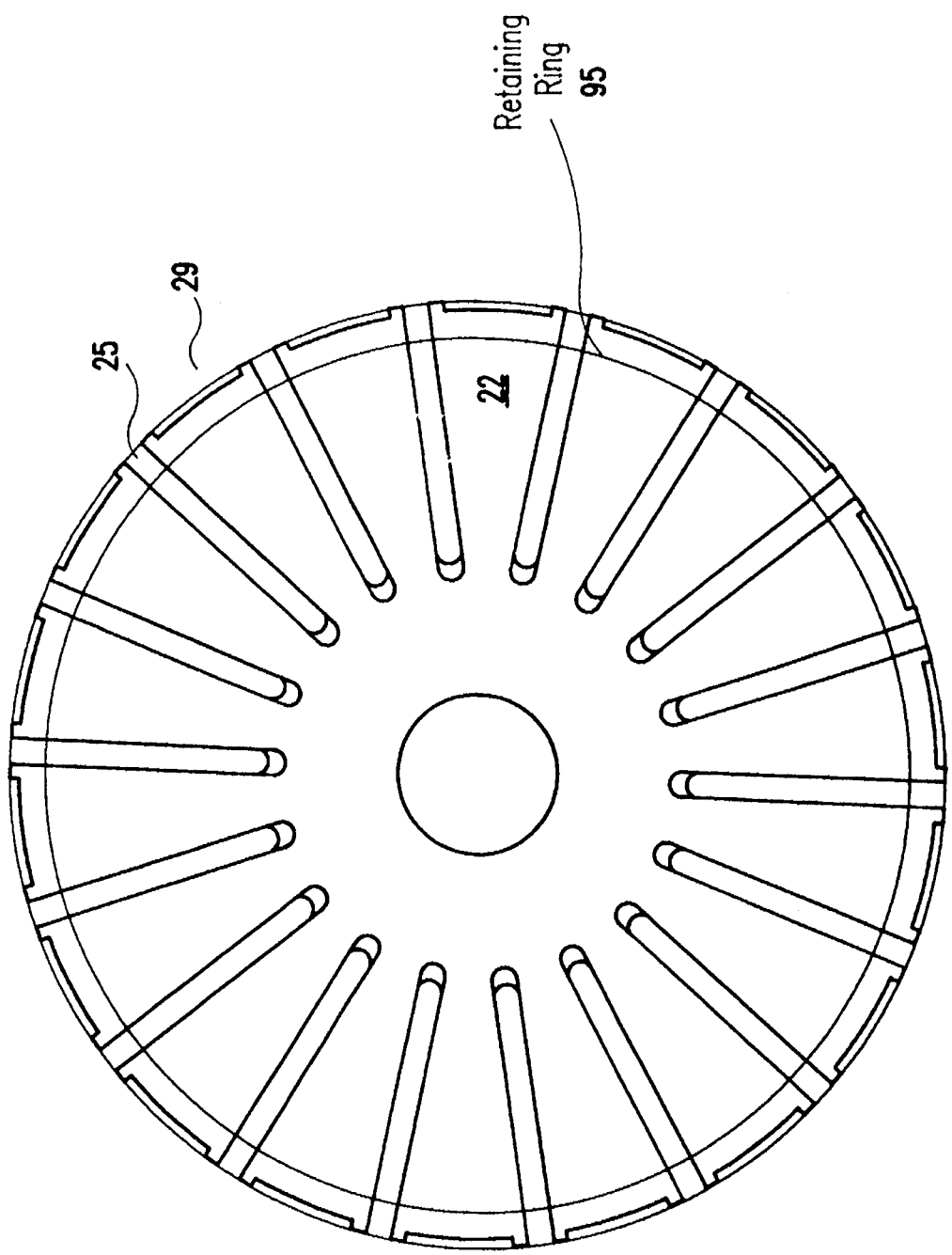
FIG. 4 is a front cutaway view of the rotor showing rotor reinforcement rings.

One or more rotor reinforcement rings 95 may be integrated into the rotor assembly as shown by FIG. 4. These rings 95 (only one of which is illustrated in FIG. 4 for simplicity) are incorporated at the axial ends of the rotor assembly and serve to bridge the open vane slits with rigid support. The rings 95 increase the rigidity of the otherwise segmented rotor, thereby reducing weight and improving performance. The rings incorporate recesses to allow the vane pins to slide through the rings. Multiple vane pins and stator channels per axial side of each vane may be employed to permit higher numbers of reinforcement rings on the rotor assembly without compromising the channels' guiding effectiveness as a single vane pin is passing through a particular rotor reinforcement ring.

In addition to the volumes in the main chamber cells 29, the present invention also compensates for the mini-volumes in the vane slit chambers 50 underneath each of the vanes (see FIG. 5). Without appropriately balancing the fluid pressures under each vane (i.e., within the slits) with the pressures in the two main chamber cells 29 on either side of each vane, a significant radial force would result which would result in greatly increased frictional torque on the vane pins 32 in their pin channels 34. For this reason, the local compression ratio of the vane slit chambers 50 (wherein the vanes may be seen as pistons and the slits as cylinders) is chosen to roughly correspond to the compression ratio of the main chamber cells.

One way to further accomplish this, by way of example and not by limitation, is to provide an additional port 52 or series of ports as shown in FIG. 5 so that the main chamber and vane slit cells may communicate and equalize the pressure between them. While only one such port 52 is shown in FIG. 5 for simplicity, it is apparent that each main chamber cell would have at least one port 52. If these ports were not present, combustion may occur substantially earlier in one location rather than another, which could again produce a substantial radial force on the vanes.

The pressures underneath the vanes must be sealed from the pin channels 34 which the pins 32 ride in, in order to prevent the channel from distributing or reducing the pressures. Therefore, sealing feet 54 (see FIG. 3) are added to the vanes to seal the vane slit volumes from the pin channel 34. These sealing feet 54 provide the additional function of allowing less radial height for the bulk of the vane axial length, while still maintaining proper strength at the fully extended portions of the vanes' travel. This reduction in required extension for the bulk of the vanes' axial length results in greatly increased rotor rigidity and strength as the slits are of correspondingly more shallow depth. This increase in rotor strength is important when selecting higher numbers of vanes to serve as effective sealing stages and to optimize the wave-pumping effect at the scavenging region, discussed further below.

The shape of the tips of the vanes is important to achieving the desired profile of radial forces resulting from differential fluid pressures between the main chamber and the vane slit chamber. For example, a generally square shaped vane tip 58 (see FIG. 6) that contacted the chamber wall surface would result in opposing tips of the square serving as the seal, between the compression and expansion phases. When combined with a pressure-communicating port downstream (in the opposite direction of engine rotation R) of each vane, this square tipped shape would result in a balanced radial force during compression and a strong radial outward force during expansion. The chamber shape is tailored to maintain optimal vane tip proximity to the stator surface throughout the cycle.

This latter effect should be highly desirable because the expansion pressures are much higher than the compression pressures, and the radially outward force should overcome the radially inward force resulting from the friction of the vane torque within its slit.

Referring again to FIG. 1, rotor tab extensions 56 are provided on the rotor, adjacent to each vane. These tabs accomplish several desirable effects. First, the tabs reduce the stresses on the vanes 24 by providing a support closer to the location of the fluid torque on the vane. This allows thinner and lighter vanes to be safely employed. Second, the tabs provide a means to cool the surface of the hottest region of the chamber shape, at the peak compression duration. The tabs 56 will achieve both radiant and convective cooling of this region by virtue of their close physical proximity to the chamber surface 26. The tabs should not physically contact the surface however.

Because of the presence of this radially outward fluid force on the vanes during the expansion process, a much high accelerative shape may be employed, thereby increasing power density and scavenging duration. For example, the shape of the chamber depicted in FIG. 7 is chosen so as to minimize the overall net frictional torque when considering the inertial acceleration, the resultant vane fluid pressure force, the perspective radii at which the frictional torque from the pins occur, and the radially-static force occurring from the friction of the vanes' torque within their slits.

The intake and exhaust regions 28 and 30 of the present invention will now be described in greater detail. A wave-pumping integral construction may be employed to facilitate or fully perform the scavenging process. While wave-pumping type devices have been used as superchargers, they have not been suggested for use integrally within the fundamental geometry of a vane engine. Important parameters must be altered to permit the successful operation of such a mechanism within the efficient cycle of a vane engine.

Figure 8:
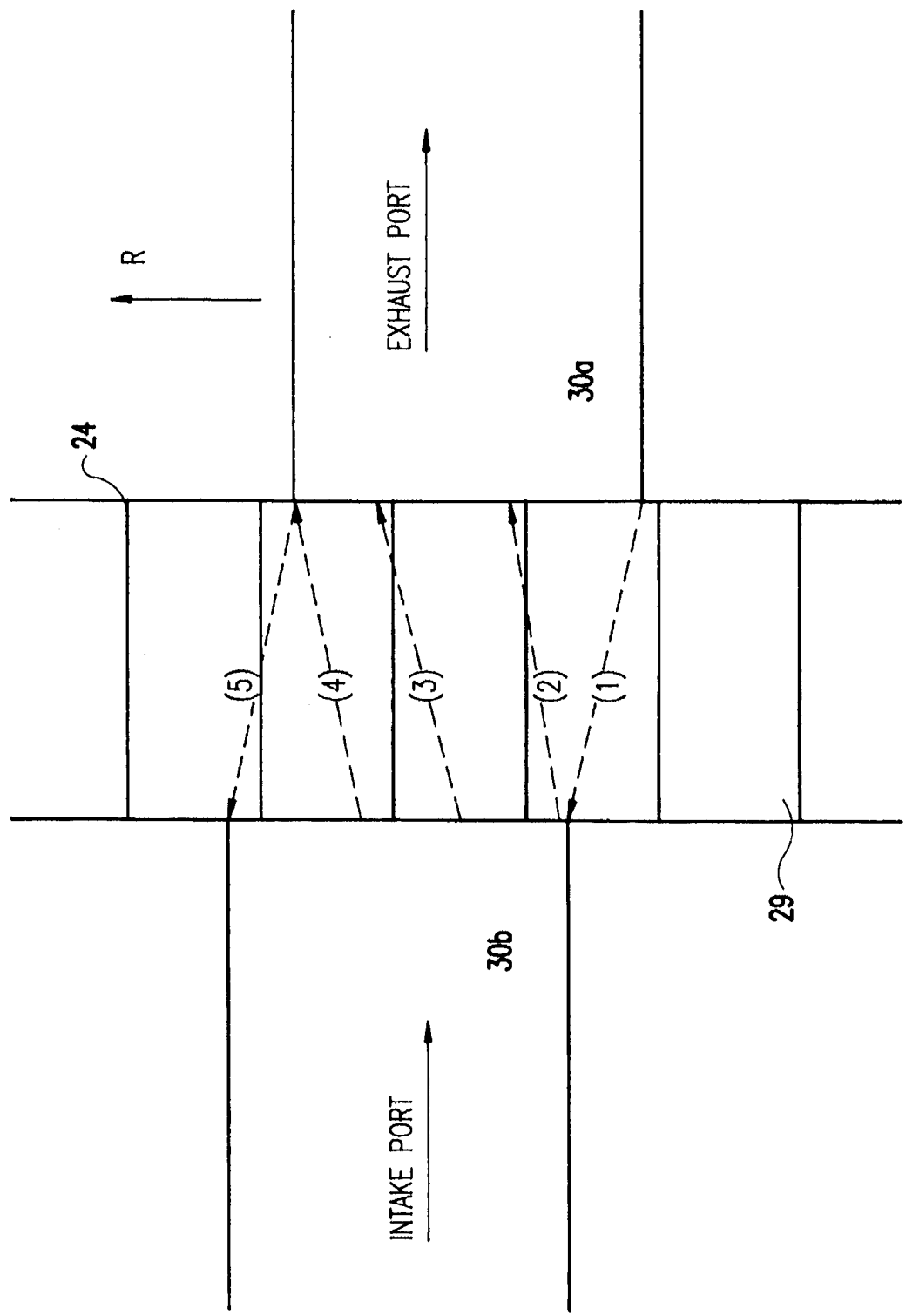
FIG. 8 is an unrolled side view drawing illustrating the chamber shape and the timing of the wave scavenging mechanism.

Referring generally to FIGS. 1 and 8, in the illustrated embodiment, the exhaust port 30*a* opens to each main chamber cell 29 prior to the fresh air (intake) port's 30*b* opening to the same cell. Also, the exhaust port 30*a* may close prior to the intake fresh air port's 30*b* closing (a similar process occurs for the other cycle at exhaust port 28*a* and intake port 28*b*). In this way, an expansion pressure wave (1) is formed as the main chamber cell 29 opens first to the exhaust port 30*a*, and the higher pressure exhaust gases within the cell communicate with the lower pressure exhaust manifold gases. This expansion waves moves towards the fresh air port 30*b*, i.e. the opposite axial side of the cell, at about the speed of sound. Just about at, or slightly before this expansion wave reaches the opposing wall, the fresh air port opens to the cell, and the expansion wave pulls in fresh air into the main chamber cell. This flow of fresh air in one end and exhaust out the opposing end continues throughout the scavenging duration while the fresh air and exhaust ports are simultaneously open to the main chamber cell {shown generally by (2), (3), (4)}.

In the case that the exhaust port closes prior to the intake port, a mild compression wave (5) may form as the exhaust port closes, and just as this compression wave reaches the fresh air port, the fresh air port closes, thereby slightly supercharging the intake air to above ambient density, thereby increasing power density.

It is important that the ports be timed properly for the proper engine speed of operation, that the duration at which flow occurs through the cell be sufficiently long to scavenge the mixture, and that the pressure of the exhaust gases prior to initial communication with the exhaust port be sufficiently high. The ratio of axial cell length to azimuthal cell width must also be sufficiently large as to allow for efficient operation of this wave device.

For applications which operate at a narrow range of engine speeds, such as in aviation, the timing or relative angular offset of the intake versus exhaust ports may be fixed and still achieve proper scavenging. For applications which require a wider range of operating speeds, various devices may be incorporated to optimize the wave port timing at all speeds. As shown in FIG. 5, for example, one means to accomplish this is to provide rotatable intake, exhaust, or both, ports 38*a* and 38*b*, so that the relative offset may be optimized.

With this wave pumping means or with other scavenging means, the two-stroke cycle of this embodiment virtually doubles the power to weight and power to size ratios while virtually halving the percentage loss due to the inertial friction of the vanes per power output, compared to a comparable four-stroke cycle.

Another advantage is that the axial flow through the cells cools the vanes with fresh air, and these cooled vanes then retract into the rotor slots where they cool the rotor slots. Because the bulk of vane length is exposed principally to the cooling flow, the self-cooling process minimizes the heat loss from the engine cycle, and thereby maximizes fuel efficiency. To further supplement cooling and lubrication of the vanes, and thereby the vane slits, fuel may be injected directly onto the vanes at about points A and B as discussed above with reference to FIG. 1. Note that in the embodiment employing axially sliding vanes (discussed below with respect to FIG. 12), the scavenging flow would move in the radial direction, that is perpendicular to the direction of sliding, but in the same plane.

It may be desirable to scavenge the vane slit cells along with the main chamber cells, so vane slit intake/exhaust regions 60, 62 may be provided to accomplish this function (see FIG. 1). A similar wave-pumping means described above with respect to the main chamber cells may also be employed with the vane slit cells. With this second wave-pumping means, cooling ports may also be employed in the rotor to provide axial cooling flow through the primary rotor structure.

The compression ratio of this invention may be adjusted by one or both of two means. The first such means utilizes rotatable port rings to vary the compression ratio. By rotating the port rings, the effective intake volume is effectively increased or decreased, thereby adjusting the compression ratio and accordingly, the power density. This may be accomplished by using the adjustable porting of the wave-pumping means 38a and 38b described above with reference to FIG. 5, or a separate rotating port means, or both. It is also understood that the rotating port means may extended around the circumference of the engine geometry.

A second means, described below, allows for the compression ratio to be adjusted without effecting the power density, which is desirable. Also, this second means allows for the compression ratio to be self-regulating, without external adjustment as in the first means.

Figure 9:
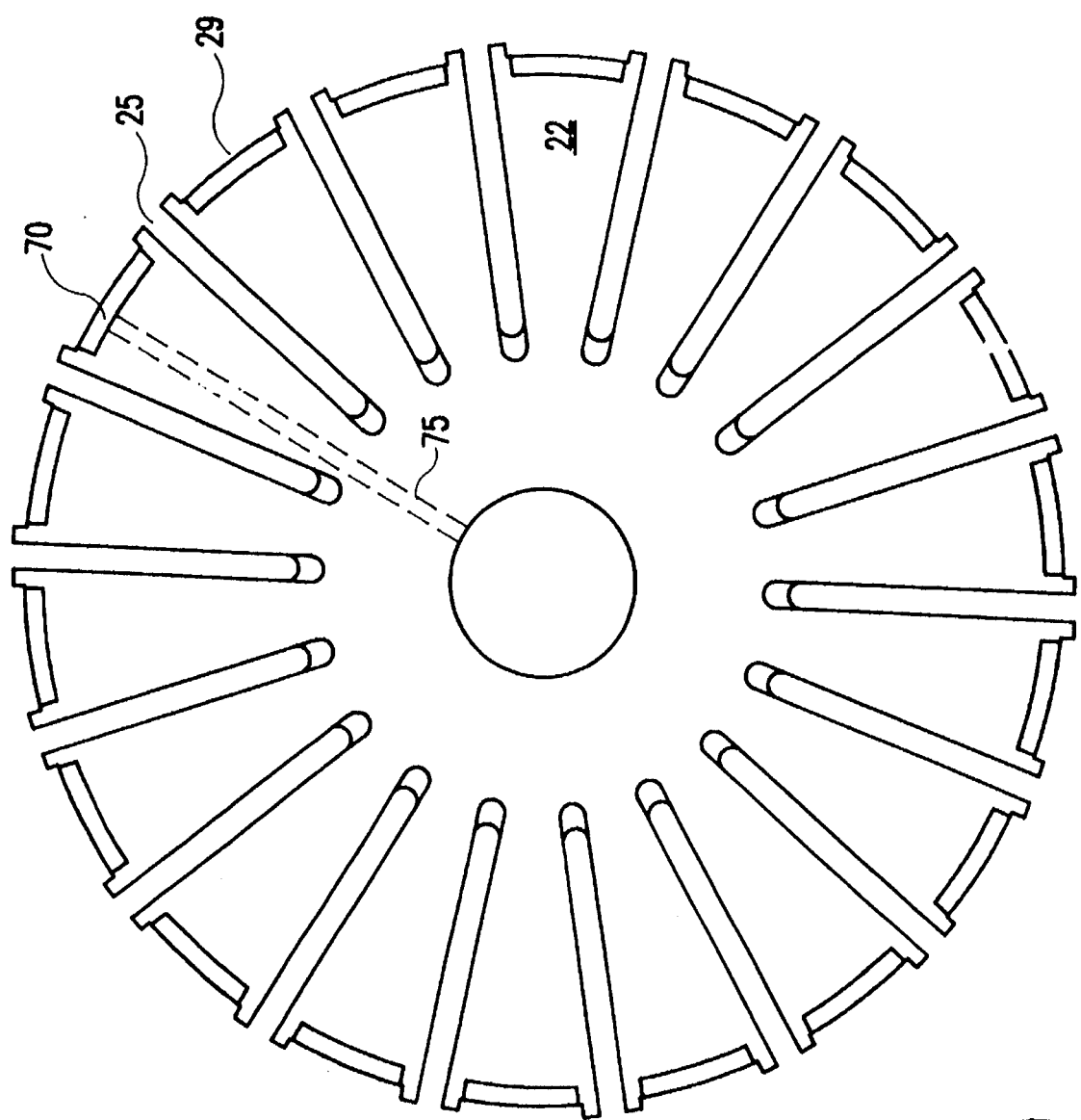
FIG. 9 is a front cutaway view of a rotor with self-regulating, variable compression ratio devices illustrated.

With reference to FIG. 9, each main chamber cell 29 incorporates a floating or movable mass 70 that is largely sealed against the rotor 22. Because of apparent centrifugal forces and/or spring forces, this movable mass 70, when configured and proportioned properly, will maintain a constant average fluid pressure within the cell for a given engine speed, considering the average pressure over the entire cycle.

For example, where the fluid pressure would otherwise decrease due to lower ambient pressures at higher altitudes, this movable mass 70 would extend radially outward in the main chamber cell, thereby increasing the compression and expansion ratios. Note that for a given main chamber cell, the mass's position in the cell does not change significantly for a given engine cycle, but rather moves gradually to its new position, which it holds constant to a large degree due to its mass.

This mechanism thereby automatically improves efficiency at higher engine speeds and higher altitudes, where higher compression ratios can be achieved without incurring preignition. Higher compression and expansion ratios translate into substantially improved efficiency for this insulated design.

Regulating pressure lines 75 may be employed, which communicate with the underside of the movable masses within the rotor and with some lower or ambient pressure source, in order to control and optimize the effects of pressure, centrifugal force, and spring forces for given engine speeds. While only one such pressure line 75 is shown in FIG. 9 for simplicity, it is apparent that pressure lines would communicate with each movable mass.

Figure 10:
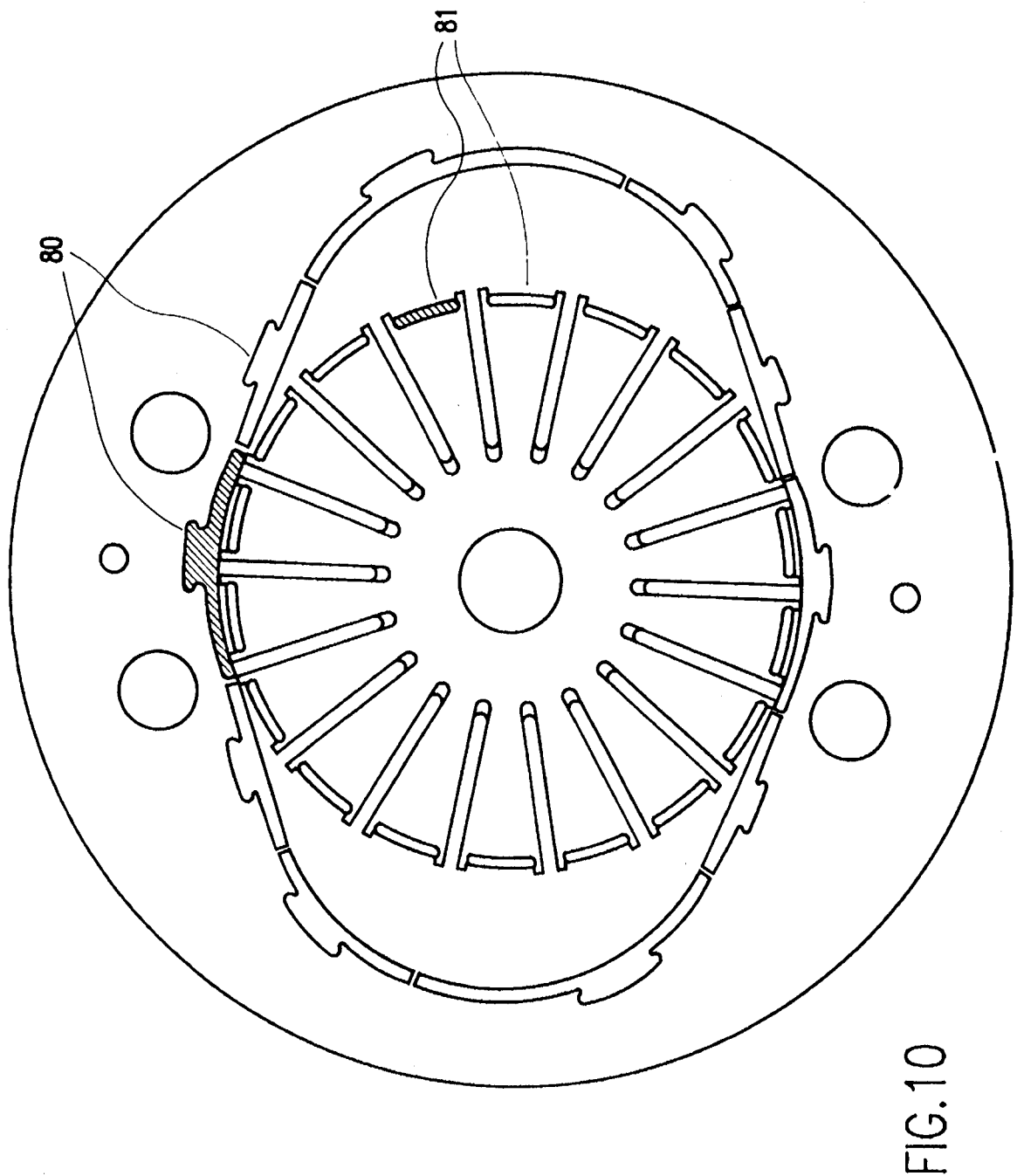
FIG. 10 is a front cutaway view of the segmented ceramic insulation inserts within the rotor and stator.
Figure 11:
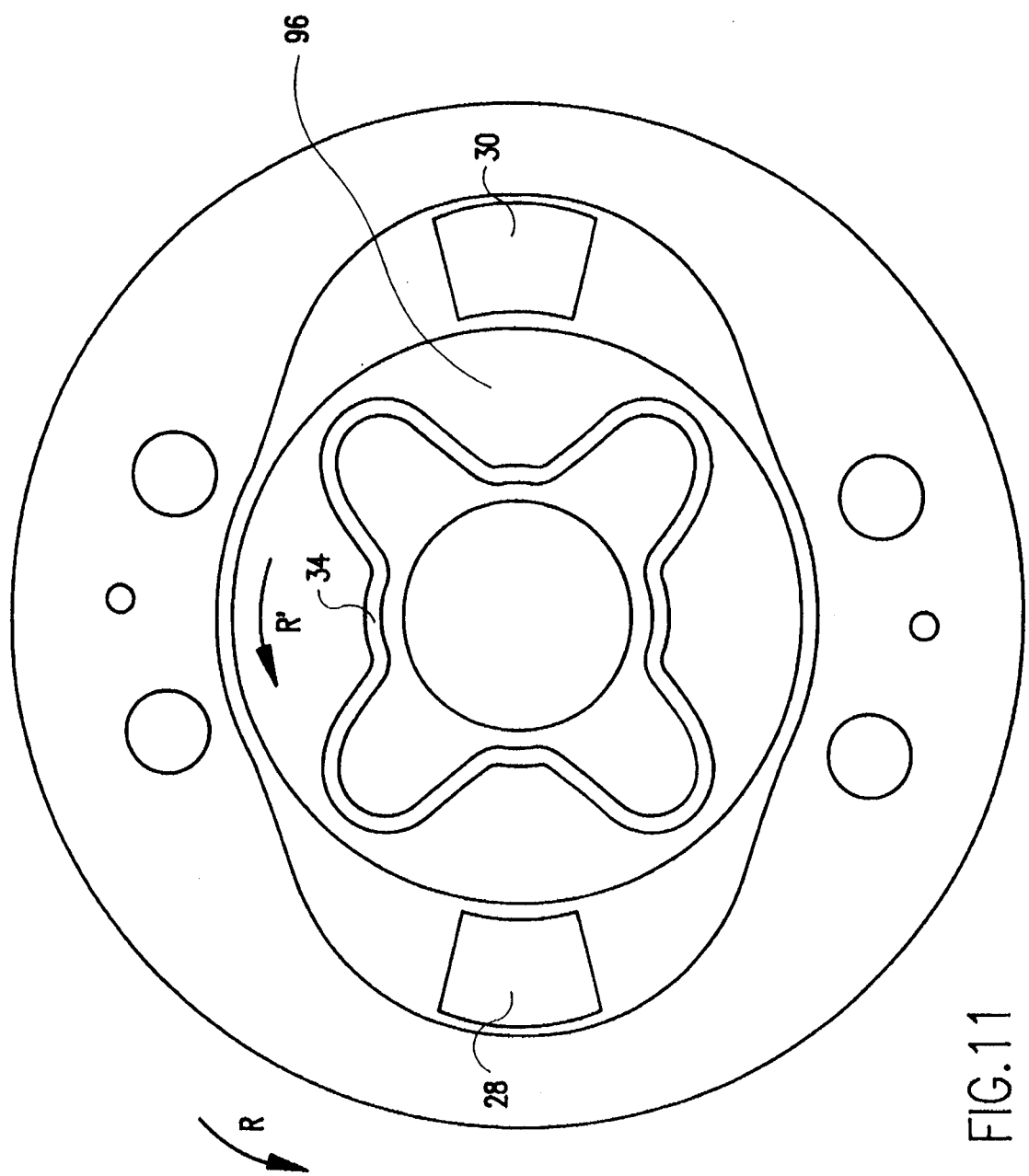
FIG. 11 is a front view of the rotating vane pin channel ring.

Now, referring to FIG. 10, a means to insulate both the rotor and stator by the use of segmented ceramic inserts will now be described. Inserts 80, 81 are attached to the chamber 26 and between the vanes slits 25 on the rotor 22 by means of some interlocking arrangement, such as dovetailed or tapered joints. One each of the inserts 80, 81 in FIG. 10 is shaded to highlight the illustrated feature. Moreover, the proportions of the inserts are exaggerated, again for illustrative purposes. The total thickness of the ceramic materials would be low due to their outstanding thermal insulation qualities. The inserts may also be effectively used in combination with the "constant mass" 70 embodiment described above.

The major advantage of a segmented ceramic construction is that, unlike a solid ceramic insert or shell, the segments can expand and contract due to the differential temperatures throughout the cycle and the cooler metal surfaces without danger of serious fractures which could result in engine failure, as has been the shortcoming of previous attempts at achieving an adiabatic rotary engine (Wankel engine) with monolithic and unsegmented ceramic shapes. A segmented construction may also be employed within a monolithic structure by bridging the segments of the stator insulation at the region of contact with the stator wall. In this way, the hot chamber portions retain the advantages of the segmented construction while the cool outer portions permit a contiguous construction.

It is the geometry and arrangement of this invention which allows a segmented construction to be applied without the segments being torn or tearing the vanes by frictional and shearing forces. In this invention, the vanes do not contact the chamber surface, and the sealing integrity is maintained by employing sufficient sealing stages with the proper number of vanes. Furthermore, this lack of contact eliminates the need for exposed lubrication on the chamber surface which would overheat in a thermally efficient, insulated design.

Moreover, several features of this invention work synergistically, in that the rotor tab extensions 56 on the rotor, the vane sealing feet 54, the vane slit equalization control means 52, and the chamber shape 26, all work together to permit higher numbers of vanes to be employed while maintaining proper rotor strength and integrity and minimizing resultant increases in inertial frictional losses.

It is also apparent that the features of the invention discussed above can all be applied to an embodiment in which the vanes move with an axial component with respect to the plane of FIG. 1.

Figure 12:
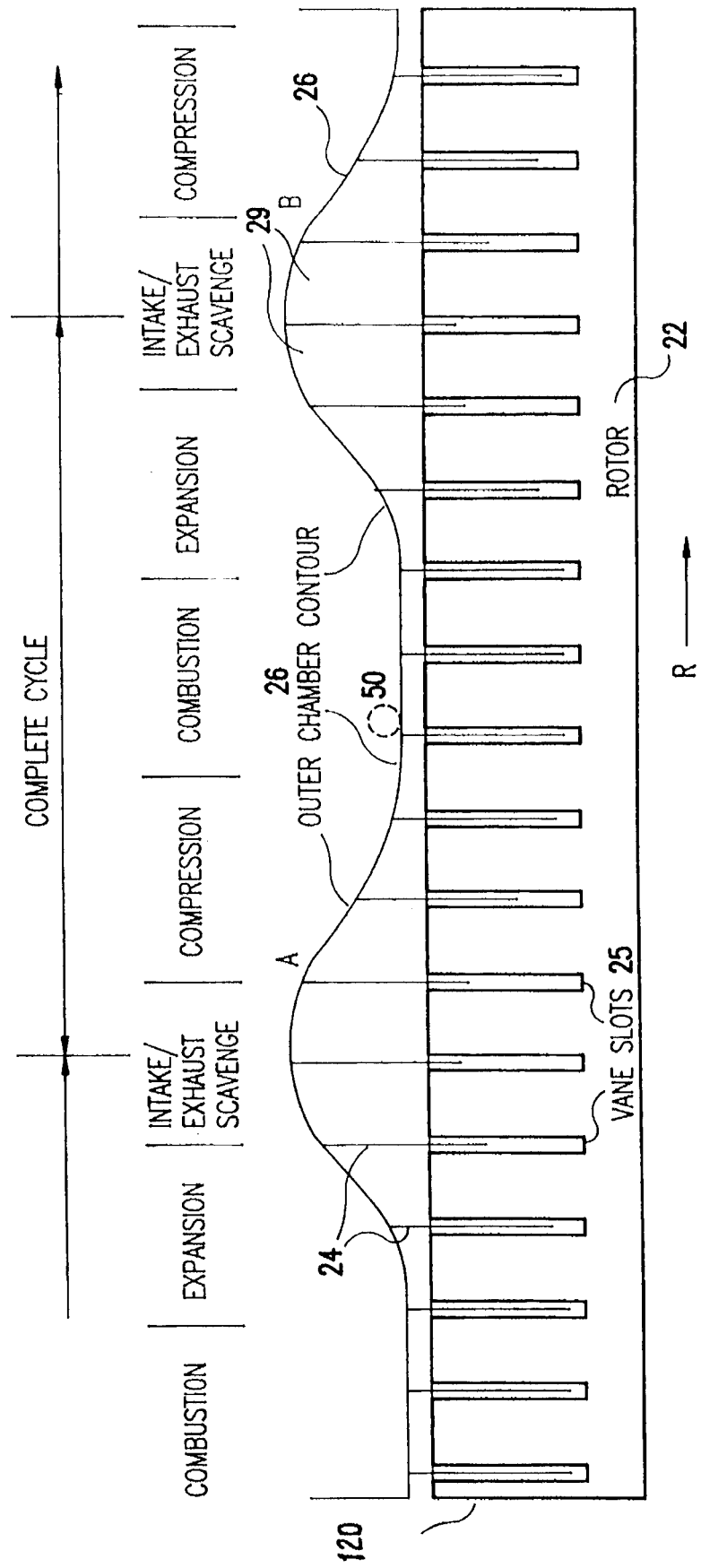
FIG. 12 is a side view of the sliding vane engine which can represent all components of vane motion.

FIG. 12 illustrates how the embodiment would appear if the rotor were unrolled or straightened. It is thus representative of an alternate embodiment wherein the vanes slide with an axial component of vane motion, or with a vector that includes both axial and radial components. It is apparent that chambers 26 and vanes 24 may be employed on one or both axial sides of the rotor. It is also apparent that the vanes in FIG. 12 may also be oriented at any angle in the plane illustrated, whereby the vanes also slide with a diagonal motion in addition to any axial or radial components.

The apparatus of FIG. 12 is designated generally as reference numeral 120 and contains the same components as the apparatus of FIG. 1 wherein the same reference numbers are used throughout to refer to the same or like parts. The apparatus of FIG. 12 contains a rotor 22, rotating in the direction shown by arrow R. The rotor 22 may also rotate in the opposite direction. The rotor 22 houses a plurality of vanes 24 which slide within vane slots 25 in a axial direction as illustrated, the vanes 24 defining a plurality of vane cells 29. A stator 26 forms the chamber outer contour surface. The sliding vane engine of FIG. 12 may of course also employ turbulence generators 40 of the type and location as discussed above in reference to FIG. 2.

The complete two-stroke engine cycle is illustrated in FIG. 12, and functions in the same manner as the two-stroke cycle described above with reference to FIG. 1, and therefore will not be discussed further here.

In either of the axial or radial embodiments, the relative motion of the rotor and stator could be swapped, wherein the 'stator' would rotate and the 'rotor' would be fixed. Such an arrangement may offer certain advantages such as reduced vane inertial friction and simpler lubrication within the rotor, but would also present disadvantages such as more complex fuel injection and air porting.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

Having thus described the invention, what I claim as new and desire to secure by Letters Patent is as follows:

1. A two-stroke sliding vane engine, wherein the vanes slide with at least of one of an axial and radial component of vane motion, comprising:

a stator;

a rotor having a plurality of radial slits, said rotor and stator being in relative rotation;

a plurality of vanes, each of said plurality of vanes sliding within each of said plurality of radial slits, said plurality of vanes defining one or more main chamber cells and one or more vane slit cells;

a means for injecting fuel into the main chamber cells; and intake and exhaust regions on opposing sides of said rotor for injecting and scavenging air from the main chamber cells, said intake and exhaust regions having a first wave pumping means for injecting and scavenging air from the main chamber cells.

2. A sliding vane engine as recited in claim 1, further comprising pressure communicating ports between said main chamber cells and said vane slit cells.

3. A sliding vane engine as recited in claim 2, wherein said pressure communicating ports provide a main chamber cell compression ratio that is approximately equal to a vane slit cell compression ratio.

4. A sliding vane engine as recited in claim 1, further comprising pins on each of the vanes, movable within a pin channel, for controlling the vane sliding.

5. A sliding vane engine as recited in claim 4, further comprising vane sealing tabs on the pins to seal the pins in said pin channel from said vane slit cells.

6. A sliding vane engine as recited in claim 1, further comprising means for controlling the compression ratio of said main chamber cells.

7. A sliding vane engine as recited in claim 6, wherein said means for controlling the compression ratio includes rotating ports.

8. A sliding vane engine as recited in claim 1, further comprising a means for controlling at least one of an intake and exhaust port in said intake and exhaust regions.

9. A sliding vane engine as recited in claim 8, further comprising an intake and scavenging means for said vane slit cells.

10. A sliding vane engine as recited in claim 9, further comprising a second wave pumping means for injecting and scavenging air from said vane slit cells.

11. A sliding vane engine as recited in claim 8, wherein said means for controlling are movable masses disposed in said main chamber cells.

12. A sliding vane engine as recited in claim 11, further comprising pressure ports from a low pressure source communicating with said movable masses for regulating at least one of pressure, centrifugal force, and spring forces.

13. A sliding vane engine as recited in claim 1, further comprising means to insulate said stator and rotor with segmented ceramic inserts.

14. A sliding vane engine as recited in claim 1, further comprising means for generating air turbulence to mix the fuel and air in the main chamber cell prior to a combustion phase.

15. A sliding vane engine as recited in claim 1, further comprising at least one of a combustion residence chamber, continuous combustion geometry, and hot gas injection, communicating with the fuel and air in the main chamber cell.

16. A two-stroke sliding vane engine, wherein the vanes slide with at least of one of an axial and radial component of vane motion, comprising:

a stator;

a rotor having a plurality of radial slits, said rotor and stator being in relative rotation;

a plurality of vanes, each of said plurality of vanes sliding within each of said plurality of radial slits, said plurality of vanes defining one or more main chamber cells and one or more vane slit cells;

a means for injecting fuel into the main chamber cells;

intake and exhaust regions for injecting and scavenging air from the main chamber cells; and a means for controlling the compression ratio of the main chamber cells, wherein said means for controlling are movable masses disposed in said main chamber cells.

17. A sliding vane engine, wherein the vanes slide with at least of one of an axial and radial component of vane motion, comprising:

a stator;

a rotor having a plurality of radial slits, said rotor and stator being in relative rotation;

a plurality of vanes, each of said plurality of vanes sliding within each of said plurality of radial slits, said plurality of vanes defining one or more main chamber cells and one or more vane slit cells;

pressure communicating ports between said main chamber cells and said vane slit cells, wherein said pressure communicating ports provide a vane slit cell compression ratio that is approximately equal to a main chamber cell compression ratio;

vane pins movable within a pin channel for controlling the vane sliding;

vane sealing tabs to seal the pins in said pin channel from said vane slit cells;

rotor tab extensions on said rotor on either side of each of said plurality of vanes, each of said plurality of vanes having a square shape at an end in close proximity to said stator;

a means for injecting fuel into the main chamber cells, wherein said means for injecting fuel includes one or more nozzles aligned in an axial direction and wherein one or more of said nozzles is inclined with an azimuthal component, wherein an axial spacing of the injection nozzles is approximately equal to twice the mean radial height of the main chamber cell during the mixing interval, and wherein an end nozzle at each axial end of the engine being one-half the cross-sectional area of interior nozzles, and located near the internal end plane of the engine;

means for controlling the compression ratio of said main chamber cells, wherein said means are movable masses disposed in said main chamber cells;

pressure ports from a low pressure source communicating with said movable masses;

means to insulate said stator and rotor with segmented ceramic inserts;

means for generating air turbulence to mix the fuel and air in the main chamber cell; and at least one of a combustion residence chamber, continuous combustion geometry, and hot gas injection, communicating with the fuel and air in the main chamber cell.

18. A sliding vane engine, wherein the vanes slide with at least of one of an axial and radial component of vane motion, comprising:

means for injecting a fuel-air combination into a chamber;

means for extending the duration at which the fuel-air combination is at about peak compression in the chamber;

means for combusting the fuel-air combination in the chamber;

means for expansion of the fuel-air combination in the chamber; and means for exhausting the fuel-air combination, wherein the means for extending the duration at which the fuel-air combination is at about peak compression comprises at least one of a combustion residence chamber, a continuous combustion geometry, and hot gas injection, and wherein each of said means for extending being incorporated in a stator portion of said vane engine.

* * * * *